United States Patent Office 3,718,631
Patented Feb. 27, 1973

3,718,631
4-VINYL PYRIDINE POLYMERS OF IMPROVED PROPERTIES FOR PURIFICATION OF POLYMERS CONTAINING ZIEGLER-NATA CATALYST RESIDUES
Jacques Grosmangin and Jean Peyrot, Le Havre, France, assignors to Compagnie Francaise de Raffinage, Paris, France
No Drawing. Filed Nov. 16, 1970, Ser. No. 90,102
Claims priority, application France, Nov. 15, 1969, 6939352
Int. Cl. C08f 5/00
U.S. Cl. 260—80.72                     13 Claims

ABSTRACT OF THE DISCLOSURE

A 4-vinyl pyridine copolymer or terpolymer useful in the purification of polymers prepared by ionic polymerization, e.g. with Ziegler-Nata catalysts; the copolymers and terpolymers of said 4-vinyl pyridine are prepared by copolymerizing 4-vinyl pyridine with divinyl benzene, and styrene for the terpolymer, in a specific ratio of monomers to solvent to obtain a copolymer or terpolymer with a defined and improved accessibility of the nitrogen atom to the impurities in the polymers sought to be purified; included within the invention are the method for preparing and the method for utilizing said copolymers and terpolymers of said 4-vinyl pyridine.

---

The present invention relates to resins containing poly-4-vinyl pyridine and the method of manufacturing these resins.

It also concerns the application of the said resins to the purification of polymers in solution.

In the present specification, the expressions "basic copolymers" or "resins" refer to copolymers which contain heterogeneous atoms (that is to say, which are neither carbon atoms nor hydrogen atoms) having electron doublets not contained in bonds and which therefore have a basic function in accordance with Lewis' definition. By the word "polymers" there shall be designated all other polymers and in particular polymers which have only carbon and hydrogen atoms. The expression "active atoms" will be used to designate heterogeneous atoms which have at least one doublet of electrons not contained in bonds.

The applicants' assignee in prior patent applications (e.g., Ser. No. 691,138, filed Dec. 18, 1967 refiled as a continuation-in-part application Ser. No. 50,977 filed June 29, 1970, and now abandoned and refiled as continuation application Ser. No. 252,279 filed May 11, 1972, and based in part on French application No. PV 88,204 filed Dec. 20, 1966 and in part on French application No. PV 130,976 filed Dec. 5, 1967) has already described a method of purifying polymers obtained by ionic polymerization, particularly in the presence of catalysts of the Ziegler-Natta type. One such method consists in contacting the solution of the said polymers with a basic copolymer, separating the solution and the basic copolymer after the latter has retained the soluble components of the catalytic system (which have an acid function within the definition of Lewis and are harmful to the properties of the polymers), regenerating the said basic copolymer, and finally contacting it with a new solution of polymers to be purified.

For the carrying out of this process, the basic copolymer must have special properties: it must withstand hot solvents, have a satisfactory particle size and have a good resistance to erosion and swelling; finally, the active atoms must be easily accessible to the metallic elements to be eliminated.

An object of the present invention is the production of resins consisting of basic copolymers having improved accessibility of the active atoms as compared with the known resins, the accessibility of which does not exceed 20%. In these known resins, less than one-quarter of the active atoms (nitrogen, for example) are involved in the process of complexing of the metallic elements to be eliminated from the solutions of polymers.

During this work on the purification of polymers, the applicants have found that the accessibility of the active atoms depended on the porosity of the resins serving for the purification. This accessibility increases with the porosity. It is necessary to distinguish between two types of porosity: permanent porosity which is related to the specific surface of the resin and the porosity of swelling which manifests itself only when the resin is in the presence of a swelling agent.

The invention concerns a resin composed of a copolymer of 4-vinyl pyridine and divinyl benzene, and in a further embodiment may additionally incorporate styrene, in accordance with respective contents, expressed in weight referred to the resin, of between 30% and 70%, 10% and 60%, and 0% and 40%, the said copolymer being characterized by the fact that it has an accessibility of the nitrogen atoms of more than 50%.

The accessibility of the nitrogen atoms is measured by contacting the resin with a solution of a transition metal salt, for instance titanium tetrachloride $TiCl_4$. It is expressed by the number of molecules of the transition metal salt which have fixed themselves on the resin per 100 atoms of nitrogen contained in said resin.

Another aspect of the invention is a method of manufacturing resins which are formed of copolymers of 4-vinyl pyridine, divinyl benzene and possibly also styrene, the accessibility of the nitrogen atoms of which is greater than 50%. The method is characterized by the fact that the copolymerization reaction is carried out in an inert gas atmosphere, at a temperature of between 60° C. and 120° C., and in the presence of a solvent for the monomers involved which solvent can also dissolve each of the homopolymers of said respective monomers separately, or of precipitating them. This method further utilizes a volume of solvent such that the ratio of the volume of the monomers to the sum of the volumes of the monomers and of the solvent is between 0.2 and 0.6; and also utilizes a quantity of divinyl benzene in the reaction medium of between 10% and 60% by weight of the mixture of monomers introduced and a quantity of styrene in the mixture of between 0% and 40% by weight of the mixture of monomers.

Another aspect of the invention concerns a process of removing from solutions of polymers traces of metallic elements which they contain when said polymers have been formed in the course of ionic reactions, particularly in the presence of Ziegler-Natta catalysts, where the resins produced in accordance with the present invention are used.

Depending on whether the resins of the invention contain styrene or not, one distinguishes between two types namely:

(1) Resins whose formula does not contain styrene have only permanent porosity;

(2) Resins whose formula contains styrene may either have permanent porosity or exhibit a swelling porosity in the presence of a given agent, or have both types of porosity simultaneously.

Permanent porosity is dependent only on the manner of manufacture of the resin, and in particular, on the amounts of divinyl benzene, or divinyl benzene plus styrene, introduced into the reaction medium, as well as the relative volumes of solvent and monomers in the medium.

The swelling porosity depends only on the swelling agent in the presence of which the resin is used, it being understood that the latter contains recurrent styrene units. Xylene, for instance, is a swelling agent.

As has been indicated above, the solvent for the monomers should either be a solvent for each of the separate homopolymers thereof taken separately, or should precipitate each of these homopolymers taken separately. This is an important characteristic of the invention, since one does not obtain resins of high accessibility if one effects the copolymerization in the presence of a solvent which would dissolve one of the homopolymers and not the other. This would be true of toluene making it unacceptable for use in this invention. The solvent is therefore selected in accordance with this criterion; which does not, however, mean that homopolymers are present in the reaction meduim.

Where one wishes to operate in the presence of a solvent for the monomers and homopolymers, one can use, for example, pyridine, since it is a common solvent for poly-4-vinyl pyridine, polyvinyl benzene and polystyrene.

The saturated hydrocarbons, for instance heptane, are solvents for monomers which precipitate homopolymers of 4-vinyl pyridine, divinyl benzene and polystyrene, respectively. They could therefore be used to carry out the process of the invention.

Applicants have established that the copolymerization reaction takes place under favorable conditions if the reaction medium, i.e., the monomers and the solvent, are dispersed. Thus, in accordance with a preferred embodiment of the process of the invention, the reaction medium is dispersed in water. The reaction medium is thus placed in suspension. The word "suspension" being given here merely by way of indication, without being, however, limited by the precise physical meaning of this term.

A typical copolymerization mixture comprises 4-vinyl pyridine and divinyl benzene dissolved in a solvent and dispersed in water to which polyvinyl alcohol has been added. It is advantageous also to add azo-bis-isobutyronitrile which is intended to initiate the copolymerization reaction. When pyridine is used as solvent for the polymerization medium, sodium chloride is added to the water in order to prevent the pyridine from dissolving, since it is partially soluble in water. The reaction medium is maintained in suspension by agitating the mixture of water, polyvinyl alcohol and solution of monomers in the solvent.

As the polyvinyl alcohol serves as dispersant in this mixture, it is obvious that this alcohol can be replaced by any other product having the same dispersing function. Likewise, the azo-bis-isobutyronitrile intended to initiate the radical reaction can be replaced by another radical initiator; benzoyl peroxide, for instance.

In the event that a saturated hydrocarbon insoluble in water is used as solvent for the copolymerization medium, it is not necessary to add salt to avoid partial solubilizing of the solvent in the water.

The copolymerization reaction is carried out with agitation a temperature close to 80° C., for instance, in a nitrogen atmosphere for a period of time which may vary between 30 minutes and several hours. This period of time is not critical. Thereupon the resin is preferably filtered and then washed with water and finally extracted for a few hours in a nitrogen atmosphere with pyridine before being carefully dried.

The resin obtained by this method can then be used in a stationary bed or in a fluid or moving bed for the purification of polymers when ionic catalysts such as the Ziegler-Nata catalysts have been used in their preparation.

The purification of the polymers is effected in a solvent medium which differs according to whether the resin has a permanent porosity or, if it has been prepared with styrene, to whether it has a swelling porosity. In the latter case in order to benefit from the swelling porosity, it is necessary to operate in a suitable solvent which is both a swelling agent for the resin and a solvent for the polymers to be purified.

The polymer purification operation is carried out in the manner described in the aforementioned preceding patent application. This consists of contacting the purifying resin with the dissolved, or (if necessary) liquified polymers-to-be-purified. When a resin of swelling porosity is used, then one must treat the dissolved polymers in a solvent which is also a swelling agent for the resin. Such a solvent, for instance, consists of aromatic hydrocarbons, and particularly xylene.

All the tests carried out by the applicants utilizing resins according to the present invention in the purification of polymers have established that less resin is required to purify a given mass of polymers than was necessary previously, apparently as a result of the improved accessibility of these resins. In addition to this economic advantage, a technical advantage is also obtained. For a given mass of polymers, the bed of resin will be thinner and therefore the loss in head necessarily suffered by the fluid medium which passes through the resin bed will be less than that which it suffers with a resin of conventional type.

The following examples which are not of a limitative character provide a practical illustration of the invention, with reference to Table I below.

EXAMPLES I to VII

By application of the invention there were synthesized seven lots of resin, I to VII, which were prepared with different proportions of reagents as set forth in Table I.

TABLE I

| | I | II | III | IV | V | VI | VII |
|---|---|---|---|---|---|---|---|
| Production of the resins: | | | | | | | |
| Divinyl benzene (at 55%) in cc | 20 | 25 | 10 | 10 | 20 | 30 | 24 |
| 4-vinyl pyridine in cc | 15 | 10 | 25 | 25 | 25 | 25 | 15 |
| Styrene in cc | | | 15 | 15 | 15 | 15 | 10 |
| Azo-bis-isobutyronitrile in g | 1 | 1 | 1 | 1 | 1 | 1 | 1 |
| Solvent: | | | | | | | |
| Heptane cc.; $F_m$ | | | 50; 0.5 | 200; 0.2 | | | |
| Pyridine cc.; $F_m$ | 52.5; 0.4 | 52.5; 0.4 | | | 100; 0.38 | 100; 0.41 | 60; 0.41 |
| Water, in cc | 130 | 130 | 130 | 130 | 130 | 130 | 130 |
| Sodium chloride in g | 18 | 18 | | | 18 | 18 | 18 |
| Polyvinyl alcohol in g | 2 | 2 | 2 | 2 | 2 | 2 | 2 |
| Properties of the resins: | | | | | | | |
| Specific surface in m.²/g | 194 | 235 | | | | 78 | 120 |
| TiCl₄ fixing medium: | | | | | | | |
| (a) Heptane | Yes | Yes | | | | Yes | Yes |
| (b) Xylene | | | Yes | Yes | Yes | | |
| Fixing in millimols TiCl₄/g. of resin | 3.5 | 2.9 | 4.0 | 5 | 4 | 3.5 | 3.2 |
| Accessibility of nitrogen atoms in percent | 80 | 85 | 80 | 100 | 100 | 100 | 100 |

These reagents are vinyl pyridine, divinyl benzene (in the specific case commercial divinyl benzene of a density of 0.9 and containing 55% pure divinyl benzene); the solvent of the copolymerization medium is either pyridine when one operates in the presence of a solvent for the homopolymers (considered separately), or heptane in the event that one uses a solvent for the monomers which is a precipitant of the homopolymers (considered separately).

Finally, azo-bis-isobutyronitrile is used to initiate the reaction.

The products together constitute the reaction medium.

In the table, $F_m$ designates the value of the ratio of the volume of the monomers to the sum of the volume of the monomers and the volume of the solvent.

This reaction medium is introduced slowly into a 2-liter reactor which is provided with an agitator and contains water and polyvinyl alcohol as dispersing agent. Sodium chloride is added to this medium when pyridine is used in order to prevent the latter from dissolving in the water.

The different synthesis reactions are carried out in a nitrogen atmosphere with agitation for 6 hours at a temperature of 80° C. Each of the lots of resins is then filtered, washed with water, then extracted for 8 hours in a nitrogen atmosphere with pyridine and finally dried in vacuum for 12 hours at 80° C.

In Table I there are entered the various proportions of the reagents entering into the synthesis medium, as well as the composition of the medium in which this synthesis medium is dispersed.

This table also indicates the characteristics of the different resins obtained and their accessibility expressed in percent (percent) of the accessible nitrogen atoms.

In this table, "$TiCl_4$ fixing medium" designates the solvent in which the titanium tetrachloride is dissolved in order to cause it to pass onto the resin so as to test the accessibility of the nitrogen atoms of said resin.

From these examples it is seen that the resins prepared in accordance with the invention all have an accessibility which is at least equal to 80%. It is also seen, upon comparing Examples III and IV with the other examples that although the quantity of divinyl benzene present is very small, one can obtain a high accessibility of the nitrogen atoms by compensating for the small proportion of divinyl benzene with styrene and effecting the fixing of the titanium tetrachloride in a swelling medium such as xylene.

EXAMPLE VIII

This example illustrates the purification of a polymer in solution by passage over a column packed with a resin in accordance with the invention and operating in a nitrogen atmosphere.

A resin in accordance with the invention of a particle size of between 250 and 990$\mu$ and the accessibility of the nitrogen atoms of which is equal to 100 is introduced into a column of a cross-section of 47.8 cm.² over a height of 56 cm.

A solution of polybutene of 8 g./l. in xylene is passed through the column. The rate of flow of the solution is fixed at 1.5 l./hr.; the temperatures of the column and of the solution are maintained at 120° C.

Table II below shows the purification of the solution obtained by passage through the column. It will be noted that the initial polybutene solution has a very high content of catalytic residues. Columns 2 and 3 of this table indicate the concentrations of the solution in metallic elements before and after passage through the column respectively.

TABLE II

| 1 | Concentration of elements in the solution (p.p.m.) | |
|---|---|---|
| | 2 | 3 |
| Elements (impurities) | Before passage | After passage |
| Ti | 4,000 | 1 |
| Al | 1,900 | 135 |
| Cl | 1,000 | 64 |
| Fe | 26 | 3.5 |

We claim:

1. A resin of a copolymer or terpolymer consisting essentially of 4-vinyl pyridine and divinyl benzene or 4-vinyl pyridine, divinyl benzene and styrene in the amounts expressed in weight referred to the resin between 30% to 70%, 10% to 60%, and 0% to 40%, respectively, said copolymer or terpolymer having an accessibility of nitrogen atoms of more than 50% defined as the ratio in percent of the number of molecules of $TiCl_4$ which have fixed themselves on the copolymer or terpolymer per 100 atoms of nitrogen contained in said resin when contacting said resin with a solution of said $TiCl_4$.

2. A resin as claimed in claim 1 wherein said amounts are 40% to 70%, 30% to 60%, and 0%, respectively.

3. In a method for manufacturing resins formed of copolymers or terpolymers of the monomers 4-vinyl pyridine, divinyl benzene and styrene, the accessibility of the nitrogen atoms of which copolymers or terpolymers is greater than 50% defined as the ratio in percent of the number of molecules of $TiCl_4$ which have fixed themselves on the copolymer or terpolymer per 100 atoms of nitrogen contained in said resin when contacting said resin with a solution of said $TiCl_4$, the improvement which comprises dispersing said monomers in water in presence of a solvent for said monomers, carrying out the copolymerization reaction in an inert gas atmosphere at a temperature of between 60° C. and 120° C. in the presence of a said solvent for the monomers, said solvent being capable either of dissolving each of homopolymers formed from said monomers separately or of precipitating them separately, the volume of said solvent being such that the ratio of the volume of the monomers to the sum of the volume of the monomers plus that of the solvent is between 0.2 and 0.6; the quantities of 4-vinyl pyridine, divinyl benzene and styrene introduced into the reaction medium being within the ranges of 30% to 70%, 10% to 60% and 0% to 40% by weight, respectively, of the mixture of monomers introduced, said solvent being selected from the group consisting of pyridine, and a liquid, saturated hydrocarbon including a dispersing agent and a radical initiator for said polymer and agitating a mixture of said monomers, solvent, water, dispersing agent and initiator.

4. The method according to claim 3 wherein the mixture includes pyridine as solvent and sodium chloride as additive to avoid the solubilizing of the solvent in water.

5. A method according to claim 3 wherein the solvent is a liquid saturated hydrocarbon in which styrene is introduced in said mixture and said terpolymer has up to 40% styrene by weight therein.

6. A method according to claim 3 wherein the solvent is heptane.

7. A method according to claim 3 wherein said radical initiator is azo-bis-isobutyronitrile.

8. A method according to claim 3 wherein said radical initiator is benzoyl peroxide.

9. A method according to claim 3 wherein said dispersing agent is polyvinyl alcohol.

10. In a method for purifying polymers obtained by ionic polymerization whereby said polymers contain residues of a catalyst and whereby a copolymer or terpolymer of 4-vinyl pyridine is used as means to purify said polymer, the improvement comprising contacting in an inert gas atmosphere a solution of polymer sought to be purified with a copolymer consisting essentially of 4-vinyl pyridine and divinyl benzene or a terpolymer consisting essentially of 4-vinyl pyridine, divinyl benzene and styrene in the amounts expressed in weight referred to the copolymer or terpolymer between 30% to 70%, 10% to 60%, and 0% to 40%, respectively, said copolymer or terpolymer having an accessibility of nitrogen atoms of more than 50% defined as the ratio in percent of the number of molecules of $TiCl_4$ which have fixed themselves on the copolymer or terpolymer per 100 atoms of nitrogen contained in said resin when contacting said resin with a solution of said $TiCl_4$ and separating the solution of said polymer thus purified from said copolymer or terpolymer of said 4-vinyl pyridine.

11. The method according to claim 10 wherein the polymer to be purified is in solution in a swelling agent for the 4-vinyl pyridine terpolymer.

12. The method according to claim 11 wherein the swelling agent is an aromatic hydrocarbon.

13. The method according to claim 11 wherein the swelling agent is xylene.

References Cited

UNITED STATES PATENTS

| | | | |
|---|---|---|---|
| 2,540,984 | 2/1951 | Jackson | 260—88.1 |
| 2,732,351 | 1/1956 | Clarke | 260—2.1 |
| 2,828,270 | 3/1958 | Murata | 260—2.1 |
| 3,410,838 | 11/1968 | Strobel | 260—94.7 |
| 3,553,180 | 1/1971 | Cleary | 260—80.72 |

FOREIGN PATENTS

| | | | |
|---|---|---|---|
| 1,519,614 | 4/1968 | France | 260—94.9 |

JOSEPH L. SCHOFER, Primary Examiner

S. M. LEVIN, Assistant Examiner

U.S. Cl. X.R.

260—33.6 R, 33.6 PQ, 88.1 PA, 94.9 F